United States Patent [19]
Loriot

[11] Patent Number: 5,027,416
[45] Date of Patent: Jun. 25, 1991

[54] METHOD OF RECOGNIZING AND LOCATING THE POSITIONS OF TEMPLATES DISPOSED ON SHEET OR PLATE MATERIAL

[76] Inventor: Jean-Marc Loriot, 15 rue Lakanal, 75015 Paris, France

[21] Appl. No.: 283,051

[22] Filed: Dec. 7, 1988

Related U.S. Application Data

[63] Continuation of Ser. No. 777,051, Sep. 17, 1985, abandoned.

[30] Foreign Application Priority Data

Sep. 18, 1984 [FR] France .................................. 84 14281

[51] Int. Cl.[5] .............................................. G06K 9/00
[52] U.S. Cl. ............................................ 382/8; 83/73; 83/938; 358/101; 364/474.28
[58] Field of Search .................. 382/8, 58, 30, 65, 48; 358/101, 107; 364/475, 474.28; 83/522, 73, 74, 925 CC; 101/115, 117, 128.21

[56] References Cited
U.S. PATENT DOCUMENTS

| | | | |
|---|---|---|---|
| 3,200,373 | 8/1965 | Rabinow | 382/48 |
| 3,596,068 | 7/1971 | Doyle | 364/475 |
| 3,693,154 | 9/1972 | Kubo et al. | 382/48 |
| 4,178,820 | 12/1979 | Gerber | 364/475 |
| 4,327,615 | 5/1982 | Gerber et al. | 364/475 |
| 4,621,959 | 11/1986 | Kishi et al. | 364/475 |
| 4,704,694 | 11/1987 | Czerniejeweski | 358/101 |

Primary Examiner—David K. Moore
Assistant Examiner—Joseph Mancuso
Attorney, Agent, or Firm—Sughrue, Mion, Zinn, Macpeak & Seas

[57] ABSTRACT

A method of recognizing templates and detecting their positions on sheet or plate material, e.g. hide, which hide is placed on a supporting table, the method using optical reader means and template marker means which are readable by said optical reader means, the method including the improvement whereby the marker means on a template are constituted by at least one geometrical figure having a finite area and optionally including at least one characteristic line.

16 Claims, 2 Drawing Sheets

Fig:1

METHOD OF RECOGNIZING AND LOCATING THE POSITIONS OF TEMPLATES DISPOSED ON SHEET OR PLATE MATERIAL

This is a continuation of application Ser. No. 777,051, filed Sept. 17, 1985, now abandoned.

The present invention relates to a method of recognizing and locating the positions of templates disposed on sheet or plate material. The method is advantageously applied to working leather to make: baggage; footwear; gloves; clothes; wallets; etc. The method may be applied to other materials having analogous characteristics.

BACKGROUND OF THE INVENTION

It is now common practice to use a tool, such as a numerically controlled laser or the like for cut out pieces of given shape from sheet or plate material, e.g. an animal hide. It is also known to store a cutting out plan in a computer memory suitable for making best use of the sheet or plate. Such an optimal cutting out plan may be calculated by computer means providing the said sheet or plate is regular in shape, e.g. when it is made of synthetic material. The computer with the stored optimal cutting out plan can then control displacements of a laser as a function of the plan. A special problem arises when the material to be cut up is leather. Hide is not as easy to use as a plate or sheet of uniform manufactured material whose shape is predetermined prior to manufacture as a function of the use for which it is intended. No two hides are the same shape, their outlines always differ to some extent, they may include defects, they have a grain direction, etc. Taking the footwear industry as an example, all these peculiarities are taken into account when determining an optimum cut out plan. Templates corresponding to different footwear parts, in different sizes and in different designs are placed manually on each hide by specialists. The resulting cut out plan is thus specific to each hide, and the business of placing templates on a hide must be started afresh for each hide. It then becomes necessary to detect each individual cut out plan, i.e. to recognize the templates and to locate their positions on the hide, so that the plan can be stored in a computer memory. The computer can then control cut out or perform some other process, e.g. calculate wastage, control some other operation, make modifications, etc.

Proposals have already been made for identifying templates by means of bar codes. However, this type of marking is not easily read by a camera, furthermore the code must be read along a fairly accurately determined direction. Unfortunately, templates are placed in completely random directions on a hide. It thus becomes very complicated to read and record the bar codes of such templates.

SUMMARY OF THE INVENTION

The present invention provides a method of recognizing templates and their positions on sheet or plate material lying on a supporting table; the method uses optical reader means and template marker means which are readable by said optical reader means, and includes the improvement whereby the marker means on the templates are constituted by at least one geometrical figure of finite area. This geometrical figure may include a detectable point or at least one characteristic line. Such marking means may comprise a geometrical figure or a set of geometrical figures such as a triangle or a set of circles of different radiuses with their centers aligned or not aligned.

Preferably the templates are read either by means of a video matrix camera, e.g. a charge coupled device (CCD) or equivalent, with the field of view being fixed or moving relative to the supporting table, or else by means of a linear camera whose field of view moves relative to the supporting table. When the field of view moves, it may be displaced either by translation or rotation of the camera over the supporting table which remains stationary, or by moving the table underneath the camera which remains stationary, or else by moving a mirror. The motion is advantageously associated with a servocontrol system which may be optical and/or electronic and/or mechanical and/or under program control.

The frequency at which images are taken is advantageously controlled by a coder which is servocontrolled by the motion of the field of view, or else by an optical servocontrol system.

The templates, at least while the system is searching for them, are preferably devoid of optical contrast relative to the sheet or plate material on which they are placed, while the marks on the templates have significant optical contrast relative to the templates. To this end, the templates may be cut out from a laminated material constituted by first and second superposed and contrasting substances. The first substance may be reflective and the second substance should not contrast significantly with the sheet or plate material on which the templates are placed. The second substance is then cut by any suitable means around the contours of the marking means and the figures delimited by these contours are then removed to reveal the underlying first substance.

The templates may be magnetic, and co-operate with a magnetic supporting table so that once the templates have been placed on the sheet or plate material which is itself placed on the supporting table, they do not move, in particular if the supporting table is a moving table.

The camera used, whether a linear camera or a matrix camera, comprises a plurality of photosensitive elements such as diodes disposed along a line or along a matrix of n lines by m columns. The camera is placed at a suitable distance above the cutting out plane, with each diode arranged to respond to light from an area of 1 mm × 1 mm, for example, thereby giving a reading accuracy which is compatible with the cutting out accuracy obtained using a laser.

When the templates are manually positioned by specialists on the sheet or plate material to be cut up (e.g. an animal hide), and after the templates have been put into place, the camera reads the marking means on the templates and thereby determines the shape and the position of the templates. This information, together with the identification of each sheet or plate (e.g. hide) is stored in a compute memory. It is thus possible to store several cut out plans associated with a corresponding number of individual sheets or plate of material to be cut up, and to start the cutting operation itself at some later time.

When the field of view of the camera is movable and is continuously displaced (e.g. when a linear camera is used) only that number of images necessary to recording the cut out plan need actually be stored in memory.

In order to select the images to be retained in memory, i.e. in order to adjust the frequency with which images are taken, a coder may be used which is servo-controlled to the movement of the field of view and which itself controls the taking of images or the taking into account of images by suitable electronic means. Depending on the type of camera used, it may be advantageous to take images at a fixed frequency. This frequency is then set to a desired value and the coder (or other image selection means) selects those images which are to be taken into account from total set of images taken. Optical servocontrol may also be provided with the camera reading marks such as alternating optically contrasting strips suitably disposed on the supporting table in addition to reading the marking means placed on the templates.

In order to enable a camera containing photosensitive diodes (whether disposed linearly or in a matrix) to read the marking means on the templates, and in order for the marking means to be easily interpreted by the computer which receives information from the camera, the following procedure is performed in accordance with the invention. The computer stores data representing all available templates and thus only needs to identify them on the basis of the marking means. Given that photosensitive diodes are sensitive only to high optical contrast, the risk of error is reduced by ensuring that the templates have little or no contrast with the sheet or plate of material on which they are placed, while the marking means on the templates with the templates taking account of the camera's powers of separation. To this end, the templates may be cut out from a material built up from two superposed sheets, one of which is made of reflecting material, for example, and the other of which is made of material having the same color as the sheet or plate on which the template is to placed, or of some other color which is not distinguished by the camera. The outlines of the marking means are cut out in the plates (e.g. by a laser) and the non-contrasting sheet is removed from the cut out portions so as to allow the reflecting surface to appear. The contrast between the reflecting substance and the background against which it lies may be increased by suitably placed spotlamps above the supporting table. Alternatively the reflecting surfaces could be distinguished by reflecting a dark area relative to a pale template and hide.

The marking means themselves are constituted in accordance with the present invention by at least one geometrical figure of finite area. The use of geometrical figures for marking the templates is justified by the fact that it is easy for a computer to measure the area, or to recognize characteristic points or lines therein such as the center of gravity, the axes, etc., with an accuracy compatible with that required for cutting out, which is not the case for marks in the form of points or lines per se, e.g. bar code. The minimum size for a geometrical figure is a function of the size of a camera pixel.

The marking means may be a polygon such as a triangle, or an ellipse, or a set of circles of different diameters whose centers may be aligned, or not, etc.

For example, when the marking means is an ellipse the computer can calculate its area, its major axis, its minor axis, its foci, its center of gravity, and on the basis of these characteristics the computer can identify which template is concerned, where it is located and in which direction it is pointing on the sheet or plate of material to be cut up.

In another example, the marking means is triangle and the computer calculates a selection of characteristics chosen from the following: area, altitudes, midpoints, angle bisectors, orthocenter, centers of inscribed and circumscribed circles, angles, equations of identifiable lines such as the sides, points of intersection between said identifiable lines, e.g. the vertices, etc. Which characteristics can also be used to identify a particular template, to identify its position and the direction in which it is pointing on the sheet or plate of material to be cut up.

BRIEF DESCRIPTION OF THE DRAWINGS

An implementation of the invention is described in greater detail by way of example with reference to the accompanying drawings, in which.

MORE DETAILED DESCRIPTION

Figure 1:
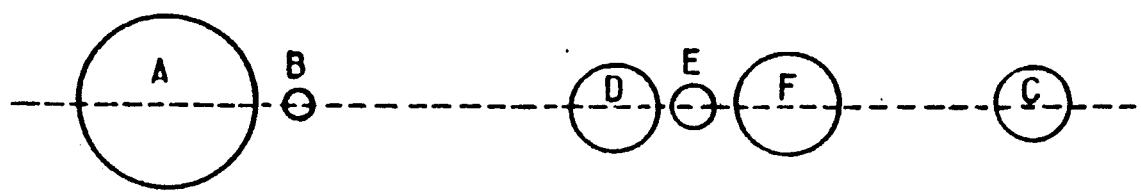
FIG. 1 shows one example of marking means comprising a plurality of circles of different diameters and having aligned centers.

In the example shown in FIG. 1, the marking means is a set of circles of different diameters having centers which are aligned. The computer searches initially for a circle (A) of given area which is identical on all of the templates and which serves to mark the presence of a template. Once the circle (A) has been detected, the computer searches at a distance d from its center of gravity to detect another circle (B) which has a different area to that of circle (A) but which is likewise identical on all the templates. The distance d is chosen to be less than some minimum distance to ensure that there is no danger of detecting the circle (B) of some other template when searching within the distance d from a given circle (A). The centers of gravity of circles (A) and (B) define a directed axis along which the computer searches for a circle (C) whose area is the same for all of the templates and different from the area of the circles (A) and (B). Naturally, there is no need for the direction (AC) to coincide with the direction (AB). Once the circle (C) has been detected, the computer has discovered the orientation of the template on the sheet or plate of material to be cut up. The computer then searches, e.g. on or adjacent to the axis determined by the centers of gravity of circles (A), (B), and (C), and between the circles (B) and (C). In this region it detects one or more circles (D), (E), (F), (..), whose areas and/or positions relative to the circles (A), (B), (C) enable the computer to identify the particular template concerned.

An example showing the application of the invention is now described with reference to FIG. 2.

This figure shows two templates a and a' which are of the same type and a third template b which is of another type. The outlines of these templates are shown in dashed lines. The positions of the templates are characterized by the positions of the centers of gravity of the corresponding circles $A_1$, $A_2$, and $A_3$, which in the present example all have a diameter of 10 mm and constitute the origins for corresponding characteristic axes e on which the centers of gravity of respective circles $B_1$, $B_2$, and $B_3$ are located. In the example shown, the circles B have a diameter of 5 mm. The A and B reference circles on all the templates have the same diameters, and they are at the same distance d apart. In addition to the circles A and B on each axis e, there are other reference marks constituted by circles C whose positions along the axes relative to the circles A and B constitute a template-determining code. It can be seen that the positions of the circles C on templates a and a' are identical.

Figure 2:
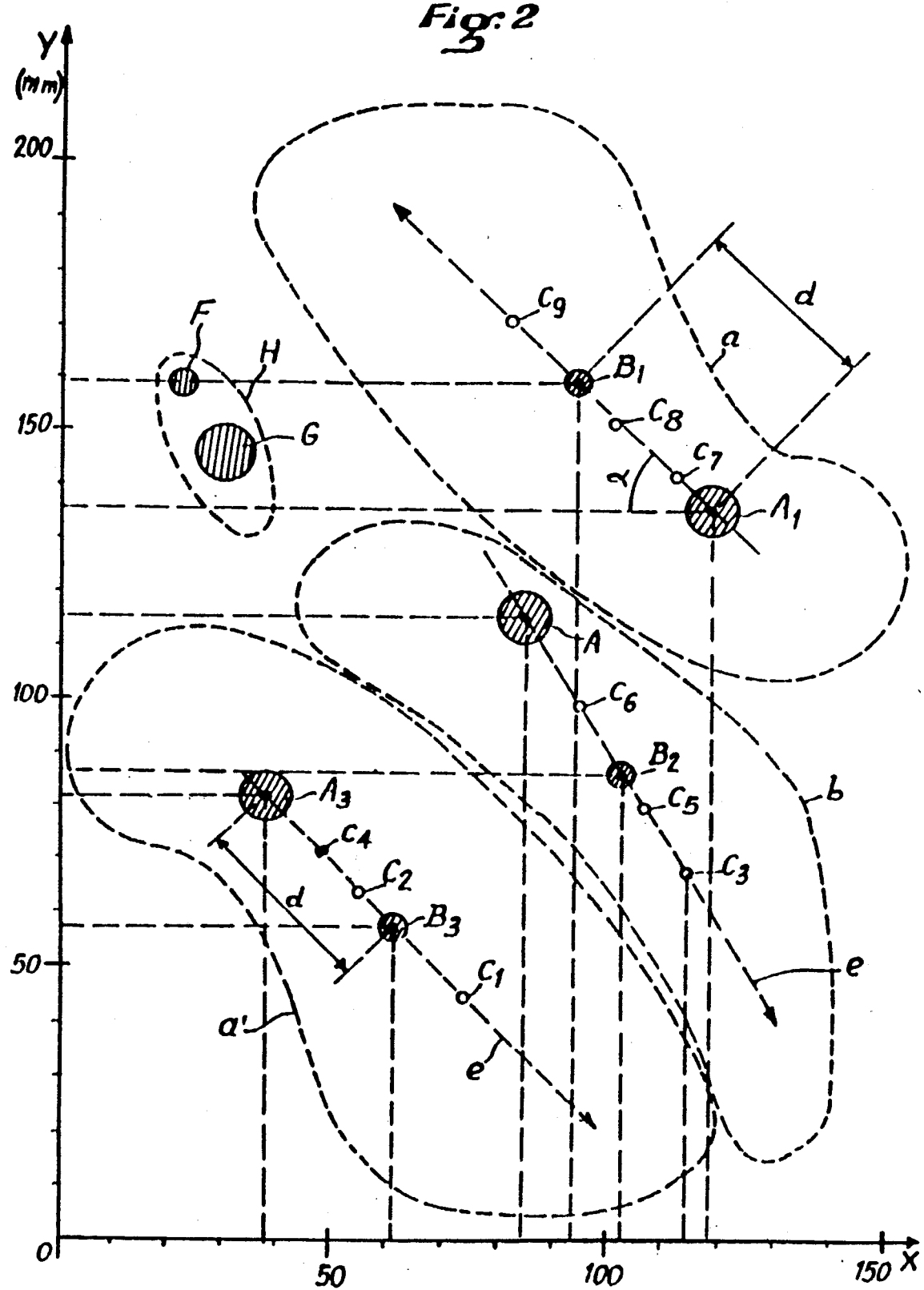
FIG. 2 is a plan view of a portion of a work surface showing three templates fitted with marking means such as those shown in FIG. 1.

Assume that the material to be cut up is scanned by means of a linear camera constituted by one hundred and fifty diodes disposed in a line parallel to the X axis of FIG. 2 with the scanning taking place along the Y axis.

In the examples shown, the scan will give the following results:

when Y=45, diode number 75 will send a pulse characteristic of a circle C to the computer which will be stored as Cy=45, Cx=75 thus giving the position of circle C1. At Y=56 diodes 61 to 63 provide pulses characteristic of a circle of greater surface area. The number of adjacent diodes which are excited by the area increases up to Y=58 at which all five diodes 59 to 64 are excited, and then the number decreases, thereby enabling the computer to identify the mark as a B circle having a center of gravity Y=58 and X=51.5 (circle $B_3$). This B circle is stored together with its co-ordinates. The computer then receives pulses from a single diode or from two adjacent diodes characteristic of a circle C at Y=64 and diode 56, thus identifying a circle $C_2$. Similarly a circle $C_3$ is identified at Y=67 and diode 115. Again at Y=75 and diode 45 there is a circle $C_4$. When Y reaches 78, the computer receives a plurality of pulses from diodes in the vicinity of diode 38, which information is characteristic of an A or a B type circle. With increasing Y, the number of excited diodes increases, and at Y=80 the computer also receives a pulse from diode 108 from circle $C_5$. At Y=83, ten diodes around the diode 38 are excited, thus indicating an A type circle having a center of gravity at Y=83, X=38, which is stored in the memory as circle $A_3$. With increasing Y, the number of diodes excited around the diode 38 decreases and at Y=85 detection of circle $B_2$ *begins* (Y=87, X=104).

Scanning continues to store the locations of all A, B, and C type marks.

The origin circles $A_1$, $A_2$, and $A_3$ are stored directly. In order to determine the orientations of the axes e characteristic of the positions of the templates, the computer identifies B type circles corresponding to each of the A type circles and calculates an angle $\alpha$ as:

$$\sin (Y_B - Y_A)/d \text{ and}$$

$$\cos (X_B - X_A)/d$$

The position of each template is thus identified by the position of the center of gravity of its A circle and by its angle $\alpha$. The type of the template is then identified by calculating the positions of the C circles relative to the center of gravity of A and along the axis e of each template. The computer associates in is memory each circle A, the corresponding angle $\alpha$ and the template code corresponding to the detected C circle(s). It is then able to recall the outline of the template and to locate said outline relative to the origin circle A and the axis e.

This information may be used later on for controlling cutting up, e.g. by laser, of the same hide whose identity and position on the cutting table relative to reference to X and Y axes are identified by a like code.

In addition to locating the positions of pieces, the invention can also be used to mark zones, for example, when laying out templates on leather, the specialist may decide only to lay out large pieces. The necessary little pieces will be cut out from the wastage between the large pieces. The layerout may simply dispose marks in these wastage areas and leave the computer to fit the corresponding little piece outlines in the available space. Such marks may specify the little piece to be inserted, and/or the number of such little pieces, and/or their positions, and/or their orientations.

By way of example, FIG. 2 shows a marker tab G of given area. This tab may indicate to the computer that it should scan the area left free between edges of parts a, a', b, . . . , surrounding the tab G and then define which little pieces to insert in said area, and where to put them.

The marker tab may have a direction, e.g. it may have two circles G and F, or else it may be in the form of an ellipse H, in which case the computer should arrange for the outlines to be in a specified orientation, e.g. parallel to the line of centers of the circles, or along a line at an angle thereto, or parallel to one of the axes of the ellipse, etc.

The present invention is not limited to the embodiments which are described above, and is capable of modifications which will be apparent to the persons skilled in the art. For example, the invention may easily be extended to robot control: it often happens that factory robots receive parts which are randomly oriented relative to the robot. A computer can evaluate their position and orientation if these parts have characteristic area marks thereon. These area marks are read by a detector unit, e.g. a camera, and the computer can then calculate the characteristics of the detected areas. So long as the area marks are disposed on the parts at accurate locations known in advance to the computer, the computer can then deduce the position and orientation of the part in question. Furthermore, the invention can be used to enable the computer to recognize which part it has found by suitably encoding the area marks thereon, thus enabling the computer to find wanted parts from a random mix of such parts.

I claim:

1. A method for recognizing templates and detecting their position on a planar material, said templates serving as guides for cutting out pieces of a given shape from said planar material, said method comprising the steps of:

providing a plurality of templates of a plurality of types characterized by differing shapes and sizes of said templates, a template of a given type having on an upper surface thereof marker means of at least one geometrical figure having a finite area and at least a characteristic line, said marker means identifying said type of template;

selectively placing and selectively orienting on said planar material at least one of said templates;

imaging with recording means said planar material and said template placed thereupon;

determining a size and a position of said at least one geometrical figure from said imaged planar material and template, thereby determining said type of template and a position and an orientation of said template on said planar material which is to be cut.

2. A method as recited in claim 1, wherein each said template has on said upper surface at least two of said geometrical figures of differing areas and wherein said determining step further determines an orientation of a line connecting said two geometrical figures from said imaged planar material and said template placed thereupon.

3. A method as recited in claim 1, wherein said imaging step comprises moving a linear camera relative to a table supporting said planar material.

4. A method as recited in claim 3, wherein said table is fixed and said moving step moves said linear camera.

5. A method as recited in claim 3, wherein said camera is fixed and said moving step moves said table.

6. A method as recited in claim 3, wherein both said table and said camera are fixed and wherein said moving step moves a mirror reflecting an image of said template and said planar material to said camera.

7. A method as recited in claim 3, wherein said imaging step further comprises detecting a speed of said moving of said camera relative to said table and controlling a frequency of operation of said camera in correspondence to said detected speed.

8. A method as recited in claim 7, wherein said detecting step is an optical detecting step.

9. A method as recited in claim 1, wherein said imaging step step uses a matrix video camera.

10. A method as recited in claim 9, wherein said template comprises a dual layer structure, an upper layer thereof having a low contrast with said planar material, said lower layer thereof having a higher contrast with said upper layer, a portion of said upper layer being removed to expose said lower layer to form said geometrical figure.

11. A method as recited in claim 1, wherein said at least one geometrical figure comprises a triangle.

12. A method as recited in claim 1, wherein said at least one geometrical figure comprises a plurality of circles of differing areas.

13. A method as recited in claim 1, wherein said geometrical figure has a higher contrast with a remainder of said said template than said remainder has with said planar material.

14. A method as recited in claim 1, further comprising magnetically attracting said template to a table supporting said planar material.

15. A method as recited in claim 1, further comprising placing a marker means in an area of said planar material to indicate processing of a different type than that indicated by said template.

16. A method as recited in claim 1, wherein said planar material to be cut is an animal hide.

* * * * *